Feb. 2, 1926. 1,571,865
G. W. OAKES
COMBINED DUST CAP AND AIR SEAL FOR TIRE VALVE STEMS
Filed Dec. 11, 1924
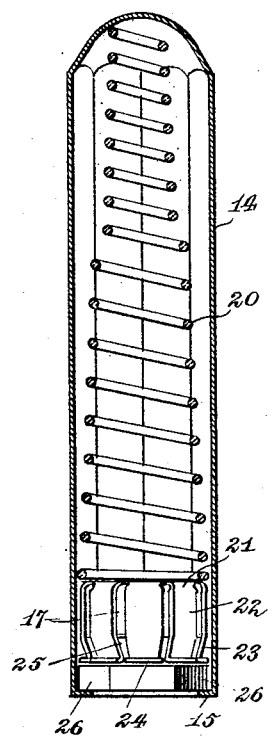
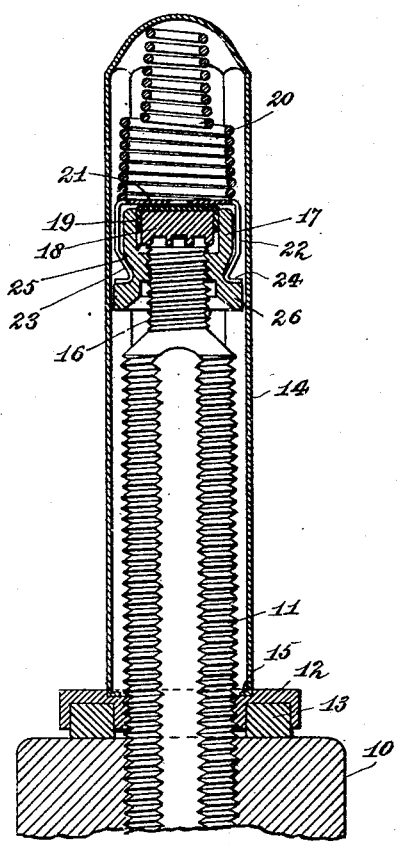
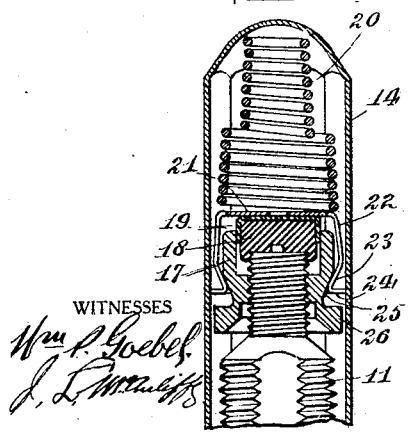
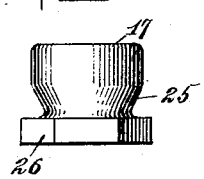
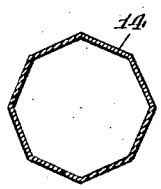
INVENTOR
George W. Oakes,
BY
ATTORNEYS Patented Feb. 2, 1926.

1,571,865

UNITED STATES PATENT OFFICE.

GEORGE W. OAKES, OF CRYSTAL CITY, MISSOURI.

COMBINED DUST CAP AND AIR SEAL FOR TIRE-VALVE STEMS.

Application filed December 11, 1924. Serial No. 755,226.

*To all whom it may concern:*

Be it known that I, GEORGE W. OAKES, a citizen of the United States of America, and a resident of Crystal City, in the county of Jefferson and State of Missouri, have invented a new and Improved Combined Dust Cap and Air Seal for Tire-Valve Stems, of which the following is a description.

My invention relates generally to combined dust and air caps for valve stems and has particular reference to a cap used in connection with pneumatic tires.

A particular object of the present invention is to provide a novel means for holding the dust and air cap against displacement and adapted to be automatically given locking engagement with the cap when the latter is placed in position.

The nature of my invention and its distinguishing features and advantages will clearly appear as the description proceeds.

Reference is to be had to the accompanying drawings forming a part of this specification, it being understood that the drawings are merely illustrative of one example of the invention.

Figure 1 is a vertical section of a dust cap and its appurtenances provided in accordance with my invention;

Figure 2 is a vertical section of said dust cap and its appurtenances together with a sectional view of a nut and valve on the valve stem, said valve stem shown in side elevation, the view including also a portion of the felly and the stem-securing nut and packing ring;

Figure 3 is a view of the upper portion of the stem and cap with the parts appurtenant thereto showing the same in position with the cap locked against displacement;

Figure 4 is a side elevation of the nut provided on the valve stem at the outer end;

Figure 5 represents a cross section of the cap.

In the illustrated example, the numeral 10 indicates a fragment of a felly; 11, the usual valve stem; 12, a nut threaded onto said valve stem adjacent the felly; and 13, the packing ring in the channel of nut 12 for holding the valve in position. The numeral 14 indicates the dust cap shown here as formed with an inturned flange 15 seated on the upper surface of the nut 12. The reduced and threaded upper end 16 of valve stem 11 receives a nut 17 shown best in Figure 4 through the upper end of which is adapted to protrude the closure member closing the stem, said closure member as shown comprising a rubber disk 18 having a metallic cap 19 thereon. The dust cap 14 has therein a coil spring 20, the outer end of which is of reduced diameter and also in said top and engaging the flange 15 when the cap is removed from the stem 11 is a cap 21 fitting over the nut 17. The cap 21 has an annular flange slitted at intervals to produce resilient fingers 22. The fingers 22 are deflected laterally inward as at 23 and terminals 24 of said fingers are out-turned. The nut 17 has an inverted conical zone 25 engaged by the inwardly directed inclined portions 23 of cap 21. Said nut 17 has its polygonal zone 26 at the inner end thereof. Also the out-turned terminals 24 on the fingers 22 lie adjacent the upper surface of the polygonal zone 26 and said out-turned members 24 serve to engage the polygonal sides of the cap 14. The assemblage in the dust cap 14 includes the nut 17, the spring 20, and the cap 21, the fingers 22 of which engage said nut.

In practice, the cap is placed over the valve stem 11 and the nut 17 is caused to engage the reduced end 16 of said stem. The nut is turned forwardly by the engagement of the polygonal cross section of the cap 14 in engaging the polygonal zone 26 of said nut. The end of the valve stem is thus caused to firmly engage the rubber disk 18. With the continued forward turning of the nut 17 the disk 18 and its metallic cap 19 will be caused to project through the nut 17 and will thereby engage the cap 21. At the same time the spring 20 will be placed under compression. As the valve cap 19 continues to exert pressure on the cap 21, the resilient fingers 22 of said cap 21 will be caused to engage the inclined zone 25 of nut 17, whereby the fingers 22 will be expanded and the out-turned terminals 24 thereof will be firmly engaged with the polygonal walls of the cap 14, the whole assemblage serving to maintain the cap 14 against displacement.

It should be stated that the purpose of the spring 20 is to force the air seal nut 17 toward the open end of the cap as in Figure 1 when the device is not in use, thereby making it possible in applying the device to the valve stem to move it forwardly on the stem until the dust cap has come in contact with the rim nut of the wheel and disregarding for the moment the air seal nut entirely as it will automatically take care of itself on the end of the valve stem. There then only remains to give the cap a few turns until the device is securely locked in place with the dust cap fully covering the valve stem and the air seal nut effectually sealing the air in the stem. The device, therefore, it will be seen, is exceedingly simple in operation and leaves practically nothing to be attended to by the operator. I would add that the making of the spring 20 of two diameters gives the spring a tendency to telescope itself when under pressure, thereby occupying a minimum amount of space. Referring to the section of the nut 17 as in Figure 2. it will be seen that the threads are placed well back toward the end of the nut which results in two advantages. The opening in front of the threads affords a guide for the valve stem into the nut and causes the nut to be approximately three-sixteenths of an inch farther onto the valve stem than it would if the threads were directly at the open end of the nut. Obviously, the arrangement described permits the dust cap to expand so much farther on the valve stem without increasing its length to any extent.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. A device of the class described, including a dust cap adapted to be placed over a valve stem, and polygonal in cross section, a nut adapted to have threaded engagement with the valve stem, said nut having a polygonal form to correspond with that of the dust cap, and an expansible locking device slidably carried by said nut and adapted to have holding engagement with said cap subject to the screwing of the nut onto the valve stem, the threads of said nut being located materially within the plane of the inner end of the nut, and said nut between the threads and said inner end forming a guide for the valve stem.

2. A device of the class described including a dust cap polygonal in cross section, a nut in said cap, and polygonal in form to correspond with the form of the cap, a member adapted to close the valve stem and adapted to protrude beyond said nut, a cap over said member and formed with resilient fingers having inclined portions directed radially inward and having outwardly disposed terminal members, said nut having an inverted conical surface engaged by said inwardly directed portions of the fingers, and a compression spring in said dust cap and bearing against the second-mentioned cap.

GEORGE W. OAKES